United States Patent
Jendbro et al.

(10) Patent No.: US 7,176,833 B2
(45) Date of Patent: Feb. 13, 2007

(54) PORTABLE ELECTRONIC DEVICES, METHODS AND COMPUTER PROGRAM PRODUCTS USING ACTIVITY-TRIGGERED GPS UPDATES

(75) Inventors: Magnus Jendbro, Lund (SE); Björn Hansson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/114,359

(22) Filed: Apr. 26, 2005

(65) Prior Publication Data
US 2006/0238417 A1    Oct. 26, 2006

(51) Int. Cl.
*G01S 5/14* (2006.01)
(52) U.S. Cl. .................. 342/357.06; 342/357.1
(58) Field of Classification Search .......... 342/357.06, 342/357.07, 357.1; 445/404.2
See application file for complete search history.

(56) References Cited

U.S. PATENT DOCUMENTS

| | | | |
|---|---|---|---|
| 5,883,594 A | 3/1999 | Lau | |
| 5,905,460 A | 5/1999 | Odagiri et al. | |
| 6,067,044 A | 5/2000 | Whelan et al. | |
| 6,141,570 A | 10/2000 | O'Neill, Jr. et al. | |
| 6,282,495 B1 | 8/2001 | Kirkhart et al. | |
| 2002/0111171 A1 | 8/2002 | Boesch et al. | |
| 2003/0050039 A1* | 3/2003 | Baba et al. | 455/404 |
| 2004/0063447 A1* | 4/2004 | Yokouchi | 455/466 |

OTHER PUBLICATIONS

International Search Report and the Written Opinion of the International Searching Authority, PCT/EP2006/061638, Jul. 26, 2006.

* cited by examiner

*Primary Examiner*—Thomas H. Tarcza
*Assistant Examiner*—Fred H. Mull
(74) *Attorney, Agent, or Firm*—Myers Bigel Sibley & Sajovec PA

(57) ABSTRACT

A portable electronic device, e.g., a mobile communications terminal, PDA or other handheld device, includes a GPS receiver and is configured to conduct non-GPS activities. The GPS receiver is transitioned out of a sleep state to attempt to acquire at least one GPS satellite signal responsive to a selected non-GPS activity of the device. For example, the GPS receiver may be transitioned out of the sleep state to attempt to acquire at least one GPS satellite signal responsive to a first non-GPS activity, and may be left in the sleep state notwithstanding occurrence of a second non-GPS activity. The first non-GPS activity may, for example, be associated with positioning of the device in a more conducive to reception of GPS satellite signals than the second non-GPS activity. For example, the first non-GPS activity may comprise an internet browsing activity, a video presentation activity, a gaming activity and/or a non-hands-free telephony activity.

22 Claims, 4 Drawing Sheets

PORTABLE ELECTRONIC DEVICES, METHODS AND COMPUTER PROGRAM PRODUCTS USING ACTIVITY-TRIGGERED GPS UPDATES

BACKGROUND OF THE INVENTION

The present invention relates to electronic apparatus, methods and computer program products for GPS applications and, more particularly, to apparatus, methods and program products for maintaining GPS navigational data.

Many portable electronic devices, such as cellular mobile terminals, personal digital assistants (PDAs), laptop computers, and the like, are now equipped with Global Positioning System (GPS) receivers. GPS is a space-based radio triangulation system using a constellation of satellites in orbit around the earth. A GPS receiver receives radio signals from various ones of the satellites and determines the times that the radio signals take to travel from the GPS satellites to the GPS receiver. By multiplying the travel time by the speed of light, the GPS receiver can calculate a range for each satellite in view. Ephemeris information provided in the satellite radio signal typically describes the satellite's orbit and velocity, thereby enabling the GPS receiver to calculate its position through a process of triangulation.

Determining the position of a GPS receiver typically requires the acquisition of a set of navigational parameters from the navigational data signals of four or more GPS satellites. This process may often take several minutes, as the duration of the GPS positioning process is generally dependent upon how much information a GPS receiver has initially. Most GPS receivers are programmed with almanac data, which coarsely describes the expected satellite positions for up to one year ahead. However, if the GPS receiver does not have some knowledge of its own approximate location, then the GPS receiver may not be able to find or acquire signals from the visible satellites quickly enough, and, therefore, cannot calculate its position quickly. Furthermore, it should be noted that greater signal strength is typically needed for capturing the C/A Code and the navigation data at start-up than is needed for continued monitoring of an already-acquired signal. It should also be noted that the process of monitoring the GPS signal may be significantly affected by environmental factors. Thus, a GPS signal, which may be easily acquired in the open, typically becomes harder to acquire when a receiver is under foliage, in a vehicle or in a building.

In order to improve GPS receiver performance, techniques have been developed to quickly provide GPS receivers with assistance data, e.g., time and position estimates, satellite ephemeris and clock information, and visible satellite list (which generally varies with the location of the mobile station), which can enable a GPS receiver to expedite position determination. Such assistance data may be transmitted, for example, from a terrestrial wireless communications system, e.g., a cellular wireless network or a wireless local area network (WLAN) access point. Such assistance data may not always be available, however, and a user may experience a significant increase in response time of the GPS receiver when such assistance data is not available, for example, when the user is traveling in an area not covered by the user's cellular service provider.

SUMMARY OF THE INVENTION

According to some embodiments of the present invention, methods are provided for operating a portable electronic device that includes a GPS receiver and is configured to conduct non-GPS activities. The methods include transitioning the GPS receiver out of a sleep state to attempt to acquire at least one GPS satellite signal responsive to a selected non-GPS activity of the device. The portable electronic device may include a processor, and the selected non-GPS activity may include an operation of a non-GPS application executing on the processor. For example, the GPS receiver may be transitioned out of the sleep state to attempt to acquire at least one GPS satellite signal responsive to a first non-GPS activity, and may be left in the sleep state notwithstanding occurrence of a second non-GPS activity. The first non-GPS activity may, for example, tend to be more conducive to reception of GPS satellite signals than the second non-GPS activity. For example, the device may be a mobile terminal, personal digital assistant (PDA) or other handheld personal electronic device, and the first non-GPS activity may include an internet browsing activity, a video presentation activity, a gaming activity and/or a telephony activity that typically involves upright, handheld or other operation of the terminal in a position advantageous for GPS signal reception.

In some embodiments of the present invention, transitioning of the GPS receiver out of the sleep state to attempt to acquire at least one GPS satellite signal responsive to a selected GPS activity of the device is preceded by detecting a non-GPS activity and, responsive to detection of the non-GPS activity, determining a status of previously acquired GPS navigational data. The GPS receiver is transitioned out of the sleep state to attempt to acquire at least one GPS satellite signal responsive to the determined status meeting a predetermined criterion. The status may include, for example, an age of the previously acquired GPS navigational data.

According to additional embodiments, transitioning of the GPS receiver out of the sleep state to attempt to acquire at least one GPS satellite signal responsive to a selected non-GPS activity of the device is followed, based on a result of the attempt to acquire at least one GPS satellite signal, by transitioning the GPS receiver to the sleep state responsive to failure of the attempt to acquire at least on GPS satellite signal or recovering GPS navigational data from the acquired GPS satellite signal responsive to acquisition of at least one GPS satellite signal.

In further embodiments of the present invention, transitioning of the GPS receiver out of the sleep state to attempt to acquire at least one GPS satellite signal responsive to a selected non-GPS activity of the device occurs while the portable electronic device is in a first device operation mode. The portable electronic device may be transitioned to a second operation mode wherein the portable electronic device acquires GPS navigational data from a terrestrial GPS assistance source instead of from a GPS satellite. In additional embodiments, transitioning of the GPS receiver out of the sleep state to attempt to acquire at least one GPS satellite signal responsive to a selected non-GPS activity of the device occurs while the portable electronic device is in a first device operation mode, and the portable electronic device transitions to a second operation mode, e.g., a low-power mode, wherein the GPS receiver is disabled.

According to additional embodiments of the present invention, a portable electronic device includes a GPS receiver, electronic circuitry configured to conduct a plurality of non-GPS activities, and an activity-driven GPS update controller configured to transition the GPS receiver out of a sleep state to attempt to acquire at least one GPS satellite signal responsive to a selected non-GPS activity of the plurality of non-GPS activities. For example, the electronic circuitry may include a processor, and the selected non-GPS activity may comprise an operation of a non-GPS application executing on the processor. The activity-driven GPS update controller may be configured to transition the GPS receiver out of the sleep state to attempt to acquire at least one GPS satellite signal responsive to a first non-GPS activity, and to leave the GPS receiver in the sleep state notwithstanding occurrence of a second non-GPS activity. The first non-GPS activity may, for example, be an activity that tends to be more conducive to reception of GPS satellite signals than the second non-GPS activity. For example, the device may be a mobile communications terminal or a handheld computing device, and the first non-GPS activity may include an internet browsing activity, a video presentation activity, a gaming activity and/or a non-hands-free telephony activity.

In yet further embodiments of the present invention, computer program products are provided for operating a portable electronic device that includes a GPS receiver and is configured to conduct non-GPS activities. The computer program product includes computer program code embodied in a computer readable medium, the computer program code including program code configured to transition the GPS receiver out of the sleep state to attempt to acquire at least one GPS satellite signal responsive to a selected non-GPS activity of the device. The portable electronic device may include a processor, and the selected non-GPS activity may include an operation of a non-GPS application executing on the processor. The program code configured to transition the GPS receiver out of the sleep state to attempt to acquire at least one GPS satellite signal responsive to a selected GPS activity of the device may include program code configured to detect a non-GPS activity, program code configured to determine a status of previously acquired GPS navigational data responsive to detection of the non-GPS activity, and program code configured to transition the GPS receiver out of the sleep state to attempt to acquire at least one GPS satellite signal responsive to the determined status meeting a predetermined criterion.

DETAILED DESCRIPTION OF EXEMPLARY EMBODIMENTS

Figure 1:
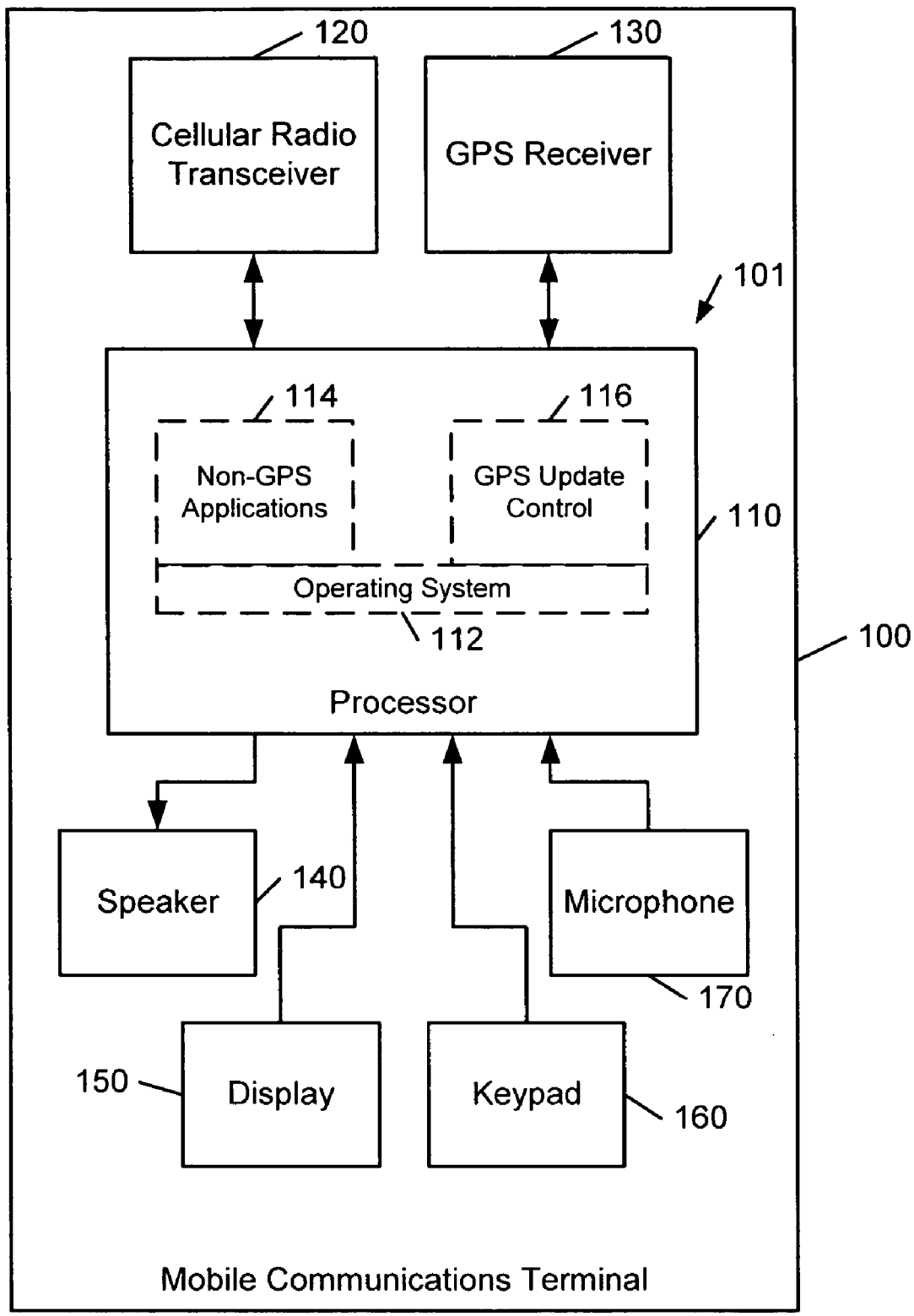
FIG. 1 is a schematic diagram illustrating a wireless terminal according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "portable electronic device" includes cellular telephone or other portable communications devices; Personal Communications System (PCS) terminals that may combine a voice and data processing, facsimile and/or data communications capabilities; Personal Digital Assistants (PDA) that may include, for example, a radio communications transceiver, Internet/Intranet access, Web browser, organizer, and/or calendar; and/or laptop and/or handheld computers or other appliances, which may also include a radio transceiver. A "portable electronic device" may be configured for handheld and/or hands-free use, may be installed in a vehicle (aeronautical, maritime, or land-based), or situated and/or configured to operate locally and/or in a distributed fashion at any other location(s) on earth and/or in space.

Some embodiments of the present invention arise from a realization that improved non-assisted GPS performance in a portable electronic device may be achieved by using selected non-GPS activities, e.g., engaging in a telephone call, a web browsing session, or the like, to trigger awakening of a sleeping GPS receiver to attempt to acquire GPS navigational data (e.g., time and/or location data) from one or more satellites, so that relatively "fresh" data may be obtained and made available before the device actually requires it for a GPS application. In some embodiments of the present invention, a GPS data refresh process may be improved if the selected non-GPS activities are activities that tend to be conducive to reception of GPS signals, such as wireless web browsing, gaming and/or telephony activities of a mobile terminal that tend to entail operation of the device in an upright, handheld or other position that is advantageous for reception of GPS signals. The device may be configured to operate in such an activity-triggered GPS update mode when GPS assistance data is not available and to transition to an assisted GPS mode when assistance data is available. In addition, activity-triggered GPS updating may be disabled when the device transitions to a user-selected mode, e.g., a low-power or standby mode.

Various embodiments of the present invention are described below with reference to block diagrams and/or operational illustrations (e.g., flowcharts) illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

FIG. 1 illustrates an example of an electronic device with an activity-triggered GPS update capability according to some embodiments of the present invention. A wireless communications terminal 100 includes a cellular radio transceiver 120, a GPS receiver 130, a speaker 140, a display 150, a keypad 160 and a microphone 170, all operatively coupled to a control processor 110. It will be appreciated that the processor 110 may comprise, for example, one or more integrated circuit data processing devices, such as a microprocessor, a microcontroller and/or a digital signal processor (DSP). As shown, an operating system 112 executes on the processor 112, providing an interface between non-GPS applications 114 and the hardware operations of the processor 110. The non-GPS applications 114 may comprise, for example, any of a number of application programs that provide user functions for the terminal 110, such as cellular telephony functions, video and/or still image display functions, gaming functions, internet browsing functions, calendaring, scheduling, word processing or other personal and/or business computing functions.

Also resident on the processor is a GPS update control application 116, shown here as operating through the operating system 112 on the processor 110, which, in combination, provide an activity-driven GPS update controller 101. As shown in examples shown below with reference to FIGS. 2–5, a GPS update controller according to the various invention, such as the controller 101 provided by the GPS update control application 116 resident on the processor 110, provides a terminal (e.g., the terminal 100) with the capability to selectively update GPS data (e.g., time, position and/or ephemeris data) responsive to one or more selected non-GPS activities, for example, selected ones of various activities of the non-GPS applications 114, while foregoing such operations for other non-GPS activities. As explained in detail below, such selected activities may comprise, for example, activities that typically involve positioning of a GPS-enabled device in a position that is more conducive to reception of GPS signals than the non-selected non-GPS activities. It will be appreciated, however, that other classifications may be used to distinguish non-GPS activities that may trigger GPS updates from non-GPS activities that do not, including user-identified non-GPS activities, such as may be selected via the display 150 and keypad 160. It will be further understood that the exemplary configuration of non-GPS applications 114 and a GPS update control application 116 operating on a common operating system 112 on a processor 110 is provided for purposes of illustration, and that other configurations, including other software configurations and/or other arrangements of electronic circuitry that provide similar functionality, fall within the scope of the present invention.

Figure 2:
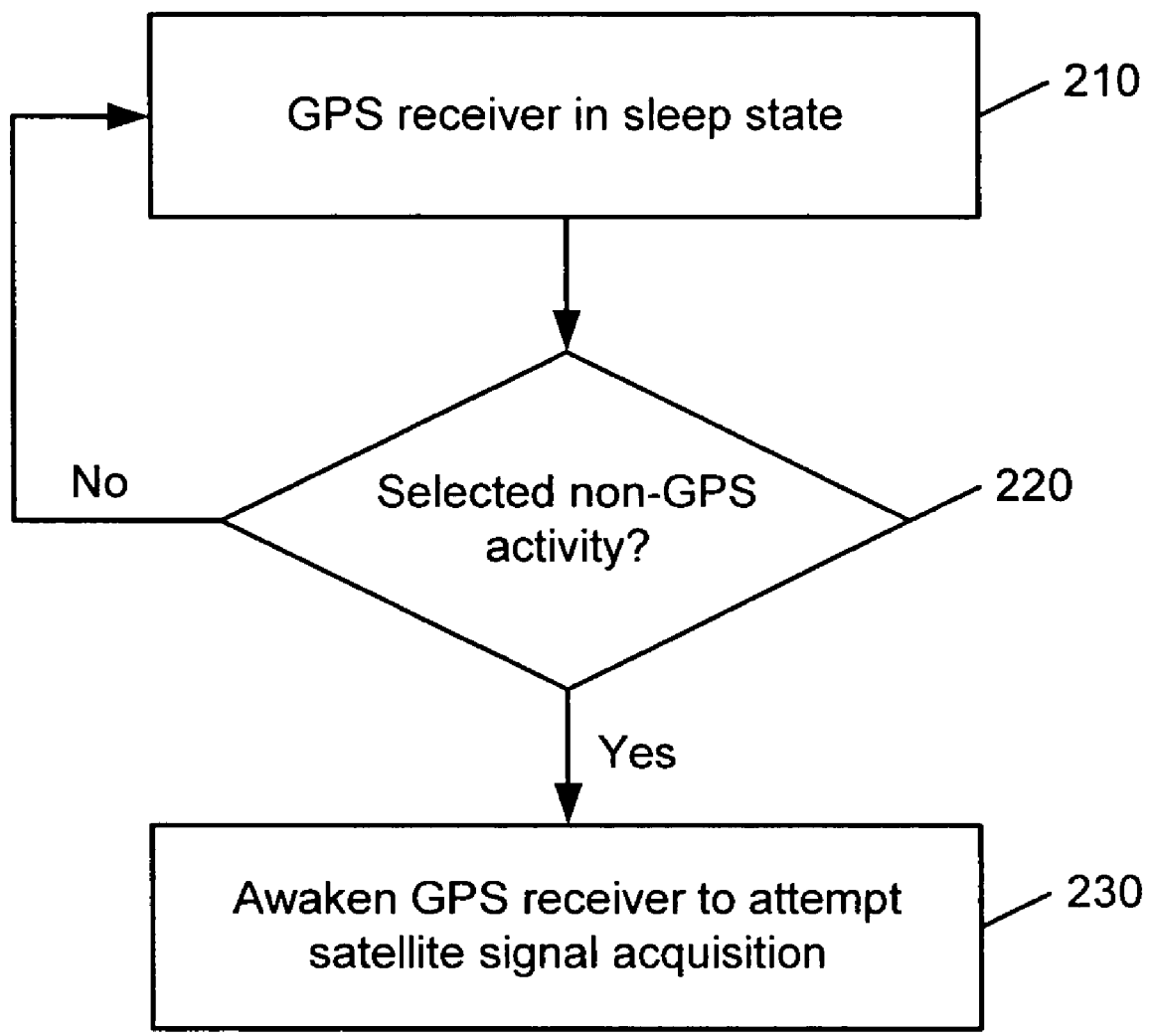
FIGS. 2–5 are flowcharts illustrating apparatus and operations for GPS update control according to further embodiments of the present invention.

FIG. 2 illustrates exemplary selective GPS update control operations for a GPS-capable electronic device according to further embodiments of the present invention, operations that may be performed, for example, by a GPS update controller, such as that provided by the GPS update control application 116 executing on the processor 110 of FIG. 1. A GPS receiver, e.g., the GPS receiver 130 of FIG. 1, is placed into a sleep state, i.e., a state in which the GPS receiver is not seeking to acquire GPS satellite signals (block 210). The GPS receiver remains in the sleep state (assuming, of course, that the device is not engaged in a GPS activity, such as a mapping or navigation application), unless a selected non-GPS activity, e.g., an activity that tends to be conducive to reception of GPS satellite signals, is detected. If such a non-GPS activity is detected (block 220), the GPS receiver is awakened to attempt to acquire a GPS satellite signal (block 230), which may include operations such as receiver activation, demodulation, and code search, which may be followed by decoding to recover GPS navigational data in the GPS signal.

Figure 3:
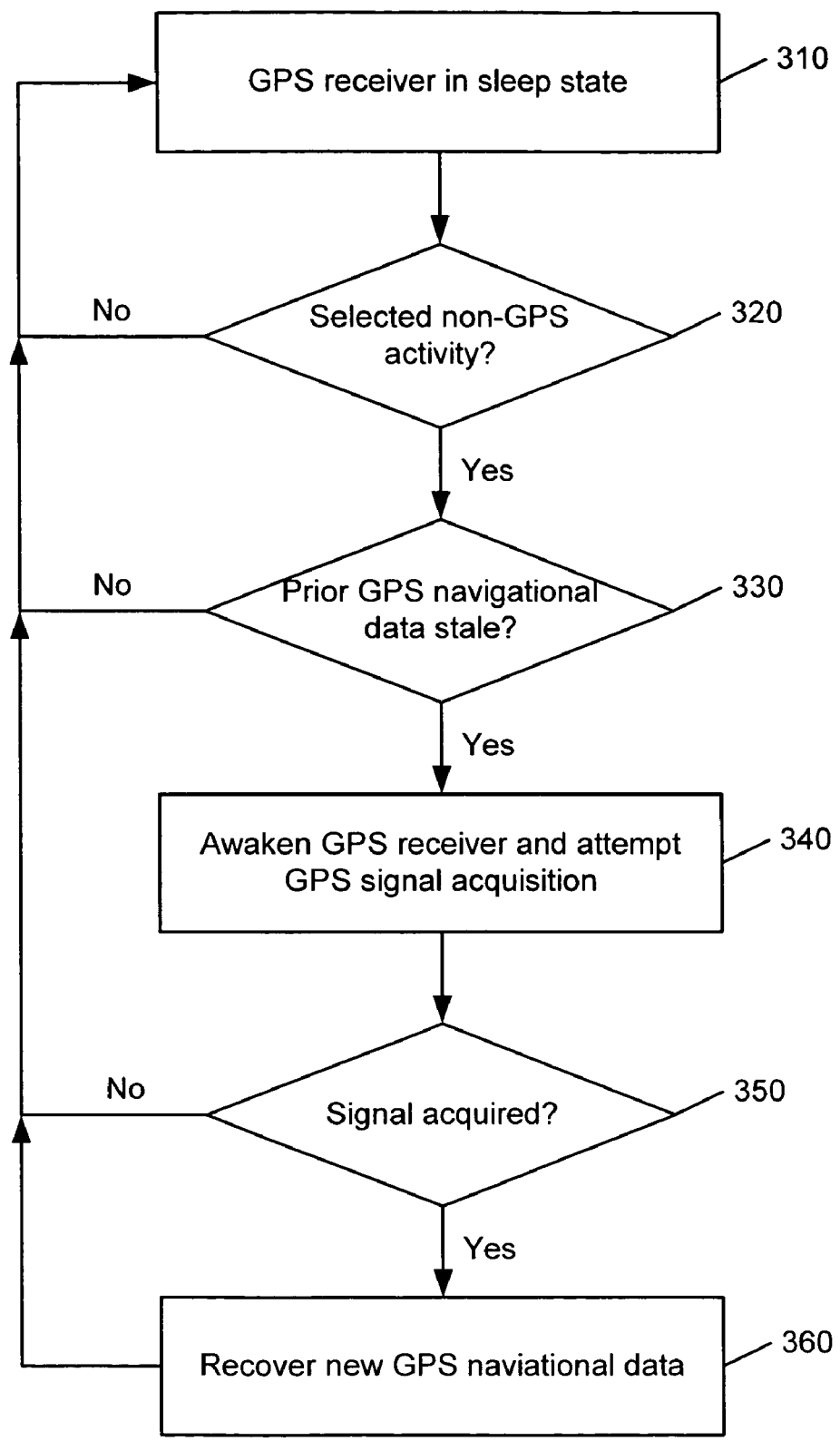
Figure 4:
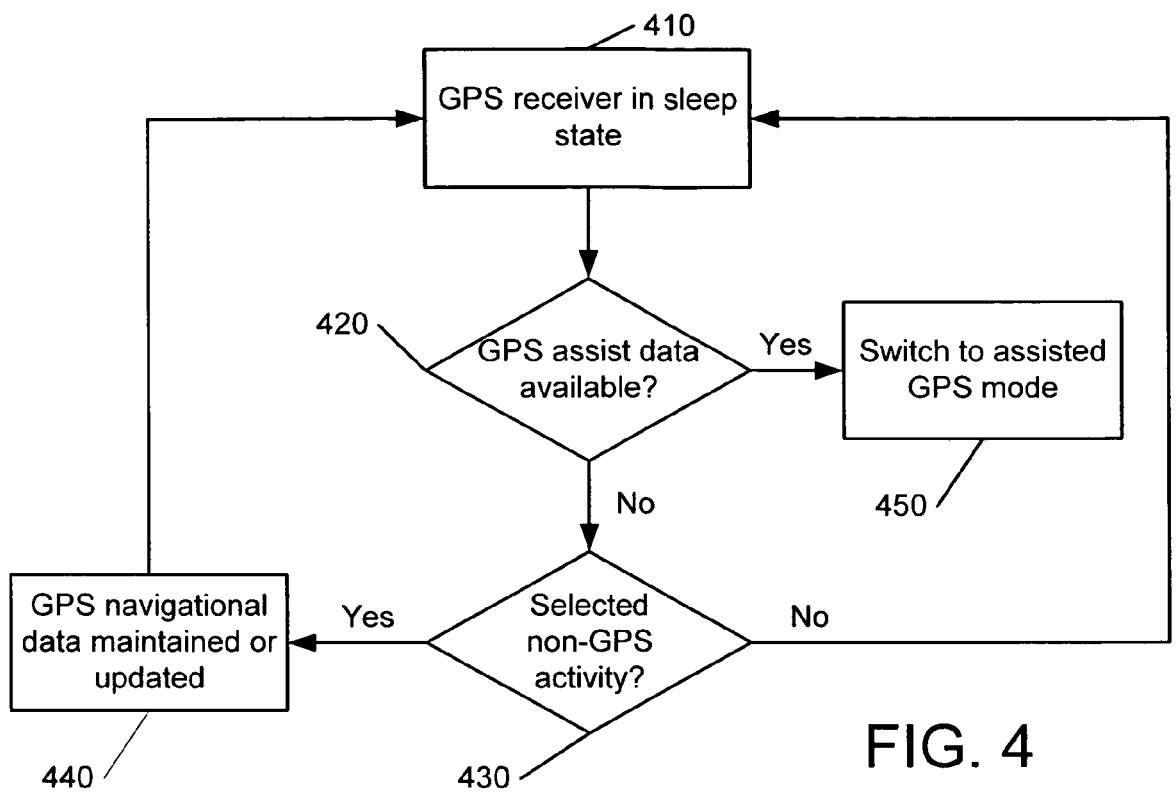

FIG. 3 illustrates exemplary apparatus and operations for activity-triggered GPS updating according to further embodiments of the present invention. A GPS receiver of an electronic device, such as a wireless mobile terminal, is placed in a sleep state, wherein it does not seek to acquire GPS satellite signals (block 310). Upon detection of a non-GPS activity, e.g., a web browsing session, gaming session or the like, the device next determines whether GPS navigational data the device previously acquired, e.g., during a previous GPS update session, has aged beyond a predetermined threshold, thus making it desirable to obtain updated GPS navigational data to replace the stale data (block 330). If the previously acquired GPS navigational data is not stale, the GPS receiver remains in the sleep state (blocks 330, 310). If the previously acquired GPS navigational data is stale, the GPS receiver is awakened and attempts to acquire GPS satellite signal (blocks 330, 340). If a GPS satellite signal is not acquired, e.g., if the device is in an environment with poor GPS satellite signal reception conditions (for example, in a signal-obstructed environment, such as inside a building or bag, and/or at a poor spatial attitude), the GPS receiver returns to the sleep state (blocks 350, 310). If a GPS satellite signal is acquired, the device recovers new GPS navigational data from the acquired signal (blocks 350, 360).

According to further embodiments of the present invention, an electronic device may be configured to selectively perform activity-triggered GPS updates depending on, for example, whether GPS assistance data is available and/or whether the device is in a selected mode, such as a power-saving mode. In exemplary embodiments of the present invention illustrated in FIG. 4, a GPS receiver of an electronic device (e.g., a wireless communications terminal) is in a sleep state (block 410). If GPS assistance data is not available and the device does not detect a selected non-GPS activity, the GPS receiver remains in the sleep state (blocks 410, 420, 430). If no assistance data is available and a selected non-GPS activity is detected, GPS navigational data is updated or maintained (block 440), e.g., using operations along the lines illustrated in FIG. 3.

Figure 5:
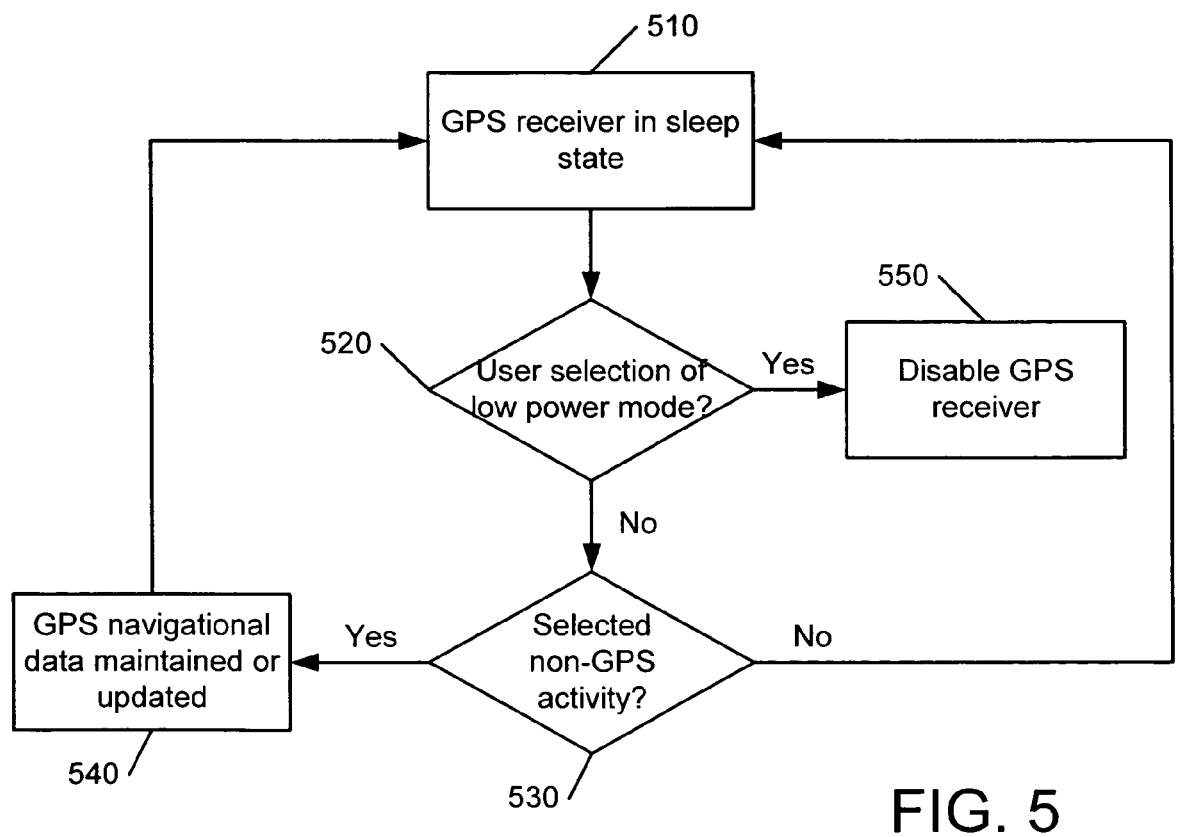

FIG. 5 illustrates further exemplary selective activity-triggered GPS update operation according to further embodiments of the present invention. A GPS receiver of an electronic device is in a sleep state (block 510). In the absence of user selection of a low power mode of operation (block 520), the GPS receiver remains in the sleep state until a non-GPS activity is detected (block 530). Upon detection of the activity, the device maintains or updates GPS navigational data (block 540), e.g., along the lines illustrated in FIG. 3. If the device detects user selection of the low power mode of operation, the GPS receiver is disabled (blocks 520, 550).

The flowcharts, flow diagrams and block diagrams of FIGS. 1–5 illustrate architecture, functionality, and operations of possible implementations of devices, methods and computer program products for activity-driven GPS update control according to various embodiments of the present invention. In this regard, each block in the flow charts or block diagrams may represent a module, segment, or portion of code, which includes one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of operating a portable electronic device that includes a GPS receiver and is configured to conduct non-GPS activities, the method comprising:
   supporting a classification of a plurality of non-GPS activities of the portable electronic device based on positioning of the portable electronic device for the respective ones of the plurality of non-GPS activities; and
   selectively transitioning the GPS receiver out of a sleep state to attempt to acquire at least one GPS satellite signal based on the classification of the plurality of non-GPS activities.

2. A method according to claim 1, wherein the portable electronic device comprises a processor, and wherein the plurality of non-GPS activities comprises an operation of a non-GPS application executing on the processor.

3. A method according to claim 1, wherein selectively transitioning the GPS receiver out of the sleep state to attempt to acquire at least one GPS satellite signal based on the classification of the plurality of non-GPS activities comprises transitioning the GPS receiver out of the sleep state to attempt to acquire at least one GPS satellite signal responsive to a first non-GPS activity, and wherein the method further comprises leaving the GPS receiver in the sleep state notwithstanding occurrence of a second non-GPS activity.

4. A method according to claim 3, wherein the first non-GPS activity is more likely to include a positioning of the portable electronic device that is conducive to reception of GPS satellite signals than the second non-GPS activity.

5. A method according to claim 3, wherein the first non-GPS activity comprises an internet browsing activity, a video and/or still image presentation activity, a gaming activity and/or a non-hands-free telephony activity.

6. A method according to claim 1:
   wherein selectively transitioning the GPS receiver out of the sleep state to attempt to acquire at least one GPS satellite signal based on the classification of the plurality of non-GPS activities is preceded by:
   detecting a non-GPS activity; and
   responsive to detection of the non-GPS activity, determining a status of previously acquired GPS navigational data; and
   wherein selectively transitioning the GPS receiver out of the sleep state to attempt to acquire at least one GPS satellite signal based on the classification of the plurality of non-GPS activities comprises transitioning the GPS receiver out of the sleep state to attempt to acquire at least one GPS satellite signal responsive to the determined status meeting a predetermined criterion.

7. A method according to claim 6, wherein the status comprises an age of the previously acquired GPS navigational data.

8. A method according to claim 1, wherein selectively transitioning the GPS receiver out of the sleep state to attempt to acquire at least one GPS satellite signal based on the classification of the plurality of non-GPS activities is followed by performing one of the following, based on a result of the attempt to acquire at least one GPS satellite signal:
   responsive to failure of the attempt to acquire at least on GPS satellite signal, transitioning the GPS receiver to the sleep state; or
   responsive to acquisition of at least one GPS satellite signal, recovering GPS navigational data from the acquired GPS satellite signal.

9. A method according to claim 1, wherein selectively transitioning the GPS receiver out of the sleep state to attempt to acquire at least one GPS satellite signal based on the classification of the plurality of non-GPS activities occurs while the portable electronic device is in a first device operation mode, and wherein the method further comprises transitioning the portable electronic device to a second operation mode wherein the portable electronic device acquires GPS navigational data from a terrestrial GPS assistance source irrespective of non-GPS activity of the device.

10. A method according to claim 1, wherein selectively transitioning the GPS receiver out of the sleep state to attempt to acquire at least one GPS satellite signal based on the classification of the plurality of non-GPS activities occurs while the portable electronic device is in a first device operation mode, and wherein the method further comprises transitioning the portable electronic device to a second operation mode wherein the GPS receiver is disabled.

11. A method according to claim 1, wherein supporting a classification of a plurality of non-GPS activities of the portable electronic device based on positioning of the portable electronic device for the respective ones of the plurality of non-GPS activities comprises supporting user classification of the plurality of non-GPS activities.

12. A portable electronic device, comprising:
   a GPS receiver;
   electronic circuitry configured to conduct a plurality of non-GPS activities; and
   an activity-driven GPS update controller configured to support a classification of a plurality of non-GPS activities of the portable electronic device based on positioning of the portable electronic device for the respective ones of the plurality of non-GPS activities and to selectively transition the GPS receiver out of a sleep state to attempt to acquire at least one GPS satellite signal based on the classification.

13. A device according to claim 12, wherein the electronic circuitry comprises a processor, and wherein the plurality of non-GPS activities comprises an operation of a non-GPS application executing on the processor.

14. A device according to claim 12, wherein the activity-driven GPS update controller is configured to transition the GPS receiver out of the sleep state to attempt to acquire at least one GPS satellite signal responsive to a first non-GPS activity, and to leave the GPS receiver in the sleep state notwithstanding occurrence of a second non-GPS activity.

15. A device according to claim 14, wherein the first non-GPS activity is more likely to include a positioning of the portable electronic device that is conducive to reception of GPS satellite signals than the second non-GPS activity.

16. A device according to claim 14, wherein the first non-GPS activity comprises an internet browsing activity, a video and/or still image presentation activity, a gaming activity and/or a non-hands-free telephony activity.

17. A device according to claim 12, wherein the activity-driven GPS update controller is configured to detect a non-GPS activity, to determine a status of previously acquired GPS navigational data responsive to detection of the non-GPS activity and to transition the GPS receiver out of the sleep state to attempt to acquire at least one GPS satellite signal responsive to the determined status meeting a predetermined criterion.

18. A device according to claim 12, wherein the activity-driven GPS update controller is configured to perform one of the following actions, based on a result of the attempt to acquire at least one GPS satellite signal:
 responsive to failure of the attempt to acquire at least on GPS satellite signal, transitioning the GPS receiver to the sleep state; or
 responsive to acquisition of at least one GPS satellite signal, recovering GPS navigational data from the acquired GPS satellite signal.

19. A device according to claim 12, further comprising means for transitioning the GPS receiver out of the sleep state to attempt to acquire at least one GPS satellite signal responsive to a selected non-GPS activity of the device occurs while the device is in a first device operation mode, and means for transitioning the portable electronic device to a second operation mode wherein the device acquires GPS navigational data from a terrestrial GPS assistance source.

20. A computer program product for operating a portable electronic device that includes a GPS receiver and is configured to conduct non-GPS activities, the computer program product comprising computer program code embodied in a computer readable medium, the computer program code comprising:
 program code configured to support a classification of a plurality of non-GPS activities of the portable electronic device based on positioning of the portable electronic device for the respective ones of the plurality of non-GPS activities; and
 program code configured to selectively transition the GPS receiver out of the sleep state to attempt to acquire at least one GPS satellite signal based on the classification of the plurality of non-GPS activities.

21. A computer program product according to claim 20, wherein the portable electronic device comprises a processor and wherein the plurality of non-GPS activities comprises an operation of a non-GPS application executing on the processor.

22. A computer program product according to claim 20, wherein the program code configured to selectively transition the GPS receiver out of the sleep state to attempt to acquire at least one GPS satellite signal based on the classification of the plurality of non-GPS activities comprises:
 program code configured to detect a non-GPS activity;
 program code configured to determine a status of previously acquired GPS navigational data responsive to detection of the non-GPS activity; and
 program code configured to transition the GPS receiver out of the sleep state to attempt to acquire at least one GPS satellite signal responsive to the determined status meeting a predetermined criterion.

* * * * *